(12) United States Patent
Jones

(10) Patent No.: US 8,890,370 B2
(45) Date of Patent: Nov. 18, 2014

(54) SYSTEMS AND METHODS FOR AN INTELLIGENT ENERGY-SAVING POWER SUPPLY

(76) Inventor: Peter W. J. Jones, Belmont, MA (US)

(*) Notice: Subject to any disclaimer, the term of this patent is extended or adjusted under 35 U.S.C. 154(b) by 731 days.

(21) Appl. No.: 13/022,852

(22) Filed: Feb. 8, 2011

(65) Prior Publication Data

US 2011/0248576 A1 Oct. 13, 2011

Related U.S. Application Data

(60) Provisional application No. 61/337,604, filed on Feb. 8, 2010.

(51) Int. Cl.
*H01H 47/00* (2006.01)
*H02J 7/00* (2006.01)

(52) U.S. Cl.
CPC .................................. *H02J 7/0036* (2013.01)
USPC .......................................................... 307/125

(58) Field of Classification Search
USPC .......................................................... 307/125
See application file for complete search history.

(56) References Cited

U.S. PATENT DOCUMENTS

| | | | | |
|---|---|---|---|---|
| 5,497,067 A | * | 3/1996 | Shaw | 320/155 |
| 6,097,113 A | * | 8/2000 | Teraoka et al. | 307/125 |
| 6,208,116 B1 | * | 3/2001 | Fischedick | 320/125 |
| 6,249,825 B1 | * | 6/2001 | Sartore et al. | 710/8 |
| 6,493,770 B1 | * | 12/2002 | Sartore et al. | 710/8 |
| D588,985 S | | 3/2009 | O'Hern | |
| 7,570,022 B2 | * | 8/2009 | Zettel et al. | 320/132 |
| 7,573,212 B2 | * | 8/2009 | Avis | 315/360 |
| 7,960,648 B2 | * | 6/2011 | McGinley et al. | 174/36 |

\* cited by examiner

*Primary Examiner* — Adi Amrany
*Assistant Examiner* — Joseph Inge
(74) *Attorney, Agent, or Firm* — Ropes & Gray LLP

(57) ABSTRACT

The systems and methods described herein include an intelligent energy-saving power supply system which conserves energy by recognizing when a chargeable electronic device, such as a cellular telephone, has been detached from its battery charger and by then cutting off power to the battery charger to prevent energy from being consumed while not serving the useful function of charging the chargeable electronic device. In addition, these systems may optionally include a device which turns off the receiver circuit of an electronic device to additionally save power and an interface which displays the amount of energy conserved by using the energy-saving power supply system.

20 Claims, 8 Drawing Sheets

SYSTEMS AND METHODS FOR AN INTELLIGENT ENERGY-SAVING POWER SUPPLY

CROSS-REFERENCE TO RELATED APPLICATIONS

This application claims priority to and the benefit of U.S. Provisional Patent Application Ser. No. 61/337,604, filed Feb. 8, 2010 and entitled "Intelligent Energy-Saving Power Supply", the entire contents of which are incorporated herein by reference.

FIELD OF THE INVENTION

The systems and methods described herein relate to a power supply system, and more specifically to an intelligent energy-saving power supply system.

BACKGROUND

In the last ten years, the practice of carrying chargeable electronic devices on one's person has become almost universal. These devices include cellular telephones, pagers, personal digital assistants (PDA), global positioning systems, and laptops, to name a few. Most people carry one, and many carry several at a time. To remain operational, all of these devices must be charged on a regular basis. Typically, the chargeable electronic devices are not designed to be plugged directly into an electrical outlet. Instead, these devices have battery chargers specifically designed for the particular device. Not only are the battery chargers for, say, laptops and cellular telephones not interchangeable, but the battery chargers for each model of laptop and each model of cellular telephone cannot be used interchangeably. As a result, a typical home will have many battery chargers, several for each member of the household.

In order not to lose or confuse all of these battery chargers, the owners of the chargeable electronic devices often leave their battery chargers plugged into a power strip in the same electrical outlet at all times, ready to charge their electronic device as needed. This practice results in a steady waste of energy, because, even when the battery charger is not charging a chargeable electronic device such as a cellular telephone, the battery charger draws some electrical power as long as the battery charger is plugged into the electrical outlet. The fact that energy is being wasted by these battery chargers on a regular basis can be readily observed even by someone entirely ignorant of the principles of electrical circuits. You only have to touch the charger on the battery charger, typically a rectangular box encased in plastic, to find that it is warm to the touch because of the energy being drawn from the electrical outlet.

Another way in which electronic devices waste energy is by constantly drawing power into receiver circuits designed to detect signals from remote controllers. Increasingly, electronic devices, such as televisions and stereo systems, include remote controllers, which the users of these devices use to turn on and off and otherwise control their electronic devices. To use a television as an example, even when the television has been turned off, the television's receiver circuit continues to draw power to retain the ability to detect a signal from the television's remote controller to turn the television display back on.

Given the concerns about climate change and other environmental harm, there is a growing awareness of the need to conserve energy. In addition, many people would like to conserve energy for the more immediately practical purpose of reducing their energy bills. For all these reasons, there is a need for a system which prevents battery chargers from consuming energy while not actually connected to a battery pack, but which also gives users the convenience of leaving the battery chargers plugged into the same electrical outlet at all times.

In addition, conserving energy requires changes in consumption behavior, and such changes are only justified if they lead to an actual reduction in energy consumption. However, the home consumer lacks the ability to determine whether changes in behavior are producing savings. Without such data, it is very difficult to justify these changes in behavior. Accordingly, we need an invention to accomplish all these goals.

SUMMARY

The systems and methods described herein include an intelligent energy-saving power supply system which conserves energy by recognizing when a chargeable electronic device, such as a cellular telephone, has been detached from its battery charger and by then cutting off power to the battery charger to prevent energy from being consumed while not serving the useful function of charging the chargeable electronic device. The energy-saving power supply system recognizes when a chargeable electronic device has been unplugged from a battery charger by virtue of the abrupt decrease in energy consumed by the battery charger. In the process, the energy-saving power supply system learns the dormant power signature of the battery charger—the energy drawn by the battery charger in its resting state. Capitalizing on this learning feature, the energy-saving power supply system cuts off power to the battery charger any time it recognizes that the battery charger is not actively charging a chargeable electronic device. In addition, these systems may optionally include a device which turns off the receiver circuit of an electronic device to additionally save power and an interface which displays the amount of energy conserved by using the energy-saving power supply system.

In one aspect, the systems and methods described herein provide for a power supply system, particularly an intelligent energy-saving power supply system. The system includes an electrical power outlet, a sensing device, a switch, and a processor. The electrical power outlet may be adapted to removably couple to a battery charger. The sensing device may be coupled to the electrical power outlet. The sensing device may sense an outlet state representative of a voltage, a current, and/or a temperature over a period of time of the electrical power outlet. The switch may control the coupling between a power source and the electrical power outlet. The processor may be coupled to the switch and to the sensing device. The processor may learn one or more outlet states of the electrical power outlet representative of decoupling and coupling of a chargeable electronic device to the battery charger. The processor may identify decoupling of the chargeable electronic device from the battery charger. The processor may open the switch, and cut power from the power source to the electrical power outlet. The processor may identify coupling of the chargeable electronic device to the battery charger. The processor may close the switch, and restore power from a power source to the electrical power supply.

In some embodiments, the power supply system includes a receiver and/or a transmitter coupled to the processor. The receiver may receive a control signal from a remote control device. The transmitter may transmit a control signal to the battery charger. The processor may include a memory. The processor may identify a control signal to turn off the battery charger. The control signal may be received by the receiver from the remote control device. The processor may store the control signal to turn off the battery charger in the memory. The processor may open the switch, and cut power from the power source to the electrical power outlet. The processor may identify a control signal to turn on the battery charger. The control signal may be received by the receiver from the remote control device. The processor may store the control signal to turn on the battery charger in the memory. The processor may close the switch, and restore power from the power source to the electrical power outlet. The processor may retrieve the control signal to turn on the battery charger from the memory. The processor may transmit the control signal to turn on the battery charger. The control signal may be transmitted a pre-determined period of time after closing the switch.

In some embodiments, the processor intermittent sends power to the battery charger to sense an outlet state of the electrical power outlet. The processor may do so in response to opening the switch. In some embodiments, the processor includes a memory. The processor may identify a dormant power signature of the battery charger. The dormant power signature may include an outlet state of the electrical power outlet being coupled to the battery charger and the battery charger decoupled from the chargeable electronic device. The processor may store the dormant power signature in the memory. In some embodiments, the processor receives an outlet state of the electrical power outlet from the sensing device. The processor may retrieve the dormant power signature from the memory. The processor may compare the received outlet state to the dormant power signature. In response to finding the received outlet state to be substantially equal to the dormant power signature, the processor may open the switch, and cut power to the battery charger. In some embodiments, the processor receives an outlet state of the electrical power outlet from the sensing device. The processor may retrieve the dormant power signature from the memory. The processor may compare the received outlet state to the dormant power signature. In response to finding the received outlet state to be substantially not equal to the dormant power signature, the processor may close the switch, and send power to the battery charger.

In some embodiments, the system includes a web server. The web server may be coupled to the processor. The web server may determine energy saved by the power supply system over a plurality of time periods. The web server may generate a web page displaying the determined energy. In some embodiments, the web server determines collective energy saved by a plurality of power supply systems. The web server may display the determined collective energy on the web page. In some embodiments, the web server includes a network interface to enable a user to access the web page. In some embodiments, the processor includes the web server.

In another aspect, the systems and methods described herein provide a method for supplying power. An electrical power outlet is provided. The electrical power outlet is arranged to removably couple to a battery charger. An outlet state is sensed. The outlet state is representative of a voltage, a current, and/or a temperature over a period of time of the electrical power outlet. The coupling between a power source and the electrical power outlet is controlled using a switch. One or more outlet states of the electrical power outlet representative of decoupling and coupling of a chargeable electronic device to the battery charger are learned. Decoupling of the chargeable electronic device from the battery charger is identified. The switch is opened to cut power from the power source to the electrical power outlet. Coupling of the chargeable electronic device to the battery charger is identified. The switch is closed to restore power from a power source to the electrical power supply.

In yet another aspect, the systems and methods described herein provide for a power supply system, particularly an intelligent energy-saving power supply system. The system includes an electrical power outlet, a switch, a processor, a receiver, and a transmitter. The electrical power outlet may be adapted to removably couple to an electronic device. The switch may control the coupling between a power source and the electrical power outlet. The processor may include a memory. The processor may be coupled to the switch. The receiver may be coupled to the processor. The receiver may receive a control signal from a remote control device. The transmitter may be coupled to the processor. The processor may transmit a control signal to the electronic device. The processor may identify a control signal to turn off the electronic device. The control signal may be received by the receiver from the remote control device. The processor may store the control signal to turn off the electronic device in the memory. The processor may open the switch, and cut power from the power source to the electrical power outlet. The processor may identify a control signal to turn on the electronic device. The control signal may be received by the receiver from the remote control device. The processor may store the control signal to turn on the electronic device in the memory. The processor may close the switch, and restore power from the power source to the electrical power outlet. The processor may retrieve the control signal to turn on the electronic device from the memory. The processor may transmit the control signal to turn on the electronic device. The control signal may be transmitted a pre-determined period of time after closing the switch.

In some embodiments, the remote control device may be coupled with the electronic device and/or the power supply system. In some embodiments, the pre-determined period of time may be associated with the electronic device.

In yet another aspect, the systems and methods described herein provide a method for supplying power. An electrical power outlet is provided. The electrical power outlet is arranged to removably couple to an electronic device. The coupling between a power source and the electrical power outlet is controlled using a switch. A control signal to turn off the electronic device is identified. The control signal is received from a remote control device. The control signal to turn off the electronic device is stored in the memory. The switch is opened to cut power from the power source to the electrical power outlet. A control signal to turn on the electronic device is identified. The control signal is received from a remote control device. The control signal to turn on the electronic device is stored in the memory. The switch is closed to restore power from the power source to the electrical power outlet. The control signal to turn on the electronic device is retrieved from the memory. The control signal to turn on the electronic device is transmitted. The control signal is transmitted a pre-determined period of time after the switch is closed.

BRIEF DESCRIPTION OF THE DRAWINGS

The foregoing and other objects and advantages of the systems and methods described herein will be appreciated more fully from the following further description thereof, with reference to the accompanying drawings wherein.

DETAILED DESCRIPTION

To provide an overall understanding of the systems and methods described herein, certain illustrative embodiments will now be described, including a power supply system, particularly an intelligent energy-saving power supply system. However, it will be understood by one of ordinary skill in the art that the systems and methods described herein may be adapted and modified for other suitable applications and that such other additions and modifications will not depart from the scope thereof.

Figure 1:
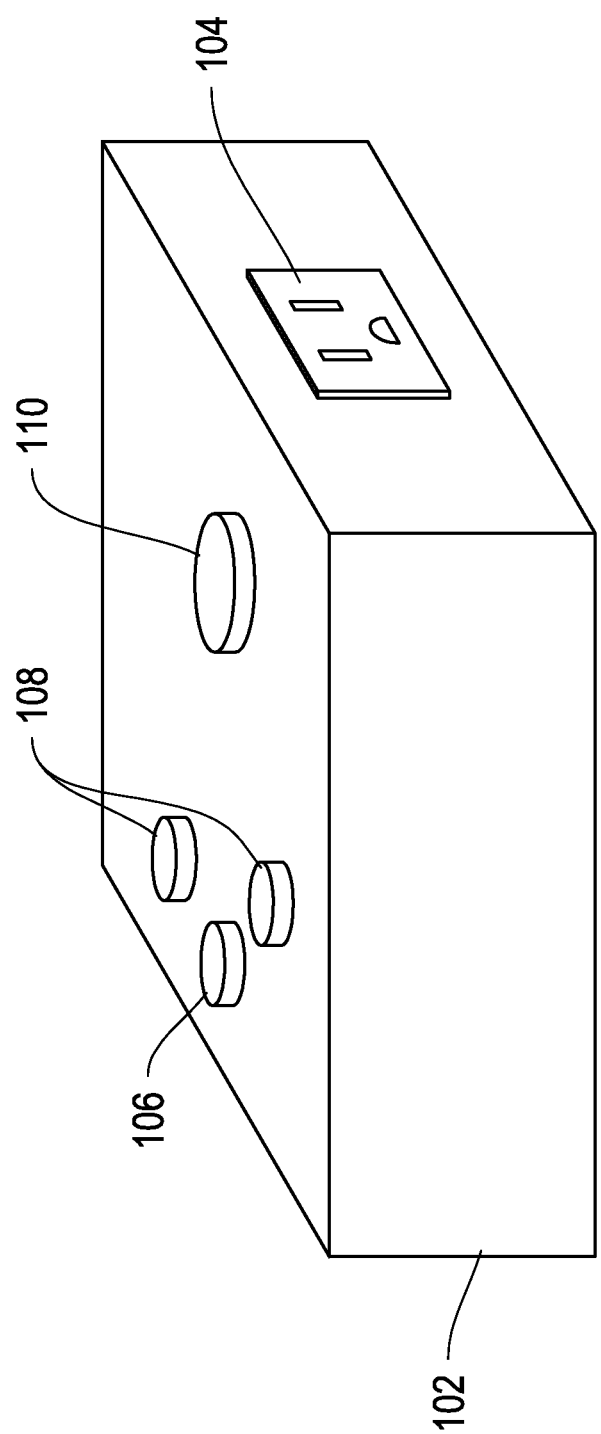
FIG. 1 depicts a power supply system, according to an illustrative embodiment.

FIG. 1 shows an intelligent energy-saving power supply system, according to an illustrative embodiment. The system is plugged to a power source 102, e.g., a wall outlet. The system includes an electrical power outlet 104, an activation switch 106, indicators 108, and remote control sensor 110. Electrical power outlet 104 is a device for removably coupling with an electrically operated device, e.g., a battery charger or an electronic device. For example, electrical power outlet 104 may provide the battery charger with electrical power. A chargeable electronic device may be plugged to the battery charger, i.e., coupled to the battery charger. Alternatively, a chargeable electronic device may be unplugged from the battery charger, i.e., decoupled from the battery charger. An outlet state of electrical power outlet 104 may indicate decoupling or coupling of the chargeable electronic device to the battery charger. The outlet state may include a voltage, a current, and/or a temperature over a period of time of the electrical power outlet. Sensing devices such as an ammeter, a voltmeter, and/or a thermometer may be employed to determine an outlet state of the electrical power outlet.

The system of FIG. 1 includes a processor that can learn one or more outlet states representative of decoupling and coupling of a chargeable electronic device to the battery charger. For example, the processor can detect (via a sensing device) the upsurge in the energy when a chargeable electronic device is plugged to the battery charger. In this manner, the process can learn when then chargeable electronic device is coupled to the battery charger. The processor may store the value corresponding to the current, voltage, and/or temperature, i.e., outlet state, of the electrical power outlet immediately previous to the upsurge. This outlet state is the dormant power signature of the battery charger, i.e., when the chargeable electronic device is decoupled from the battery charger. In this manner, the processor can learn the dormant power signature of the battery charger.

Activation switch 106 may provide a user the option to manually turn the system on or off. Indicators 108 may provide a visual representation of the operating state of the system. For example, an indicator may light up when power flows through the energy-saving power supply system to a battery charger. Further illustrations of activation switch 106 and indicators 108 are provided in reference to push button and indicators 5 in FIG. 4 below. Remote control sensor 110 may include a receiver and/or a transmitter for exchanging control signals with a remote control device. For example, the receiver component of remote control sensor 110 may receive a control signal from a remote control device to turn on an electronic device coupled to the electrical power outlet. In some embodiments, remote control sensor 110 is a teachable infrared (IR) emitter/detector and the control signals are IR signals. Further illustrations of such embodiments are provided in reference to FIG. 7 below.

Figure 2:
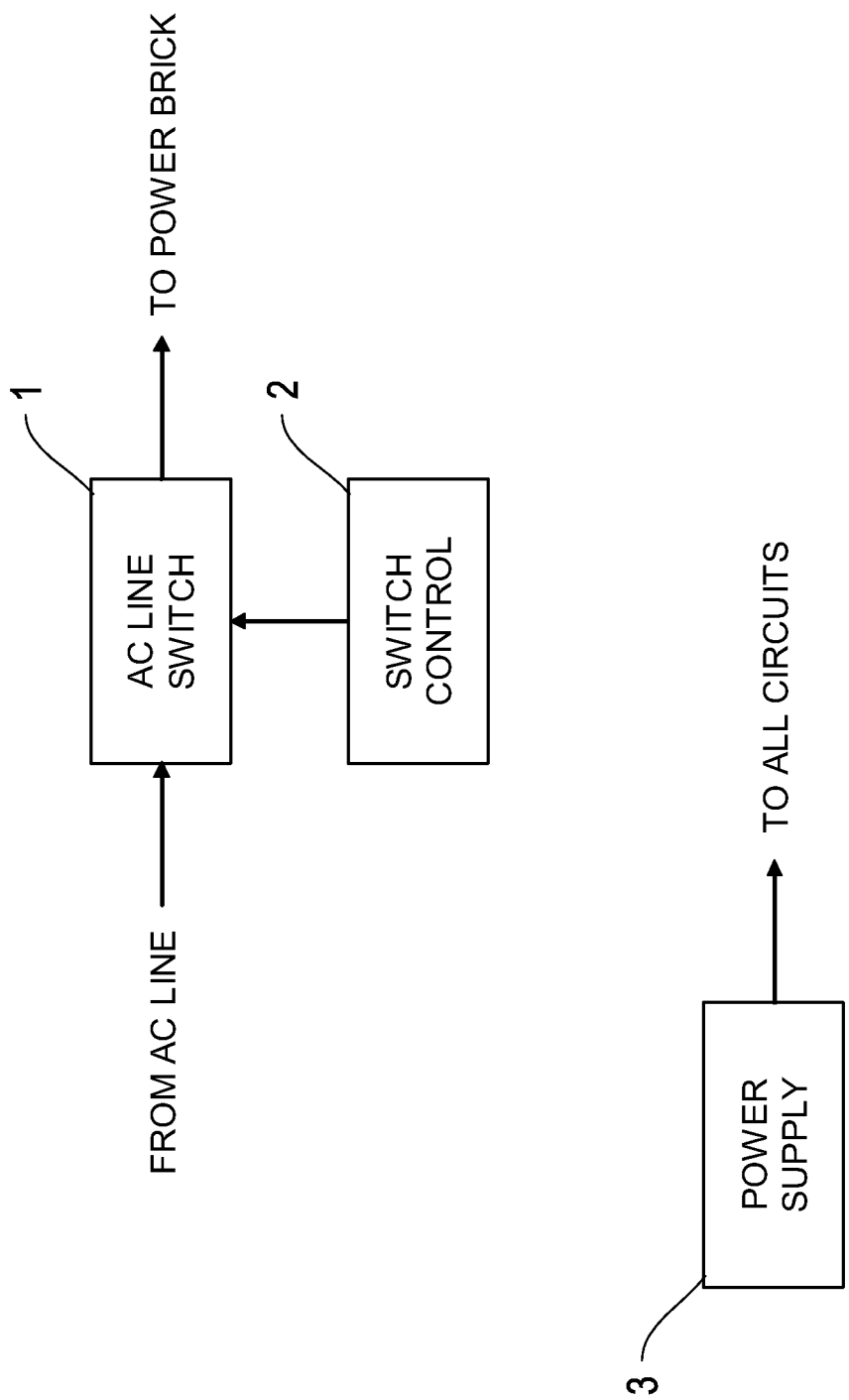
FIG. 2 is a block diagram depicting a power supply system, according to an illustrative embodiment.

FIG. 2 is a block diagram illustrating a energy-saving power supply system. A switch 1 is interposed between an AC line 5, such as an electric wall outlet, and a power supply, such as a power brick. A battery charger, such as a cell phone charger, can be plugged into the power brick 4. While the switch 1 is closed, power flows from the AC line 5 through the switch 1 to the power brick 4. When the switch 1 is open, the flow of power to the power brick 4 is disrupted, preventing power from being consumed by a battery charger. A switch control 2 controls the operation of the switch 1. In one possible embodiment, the switch control 2 could include a processor which operated the switch 1 according to an algorithm. For example, the processor might turn off power to the switch 1 for several hours during the night to prevent wasting energy, or may be turned on in the middle of the night when electric rates are lower.

Figure 3:
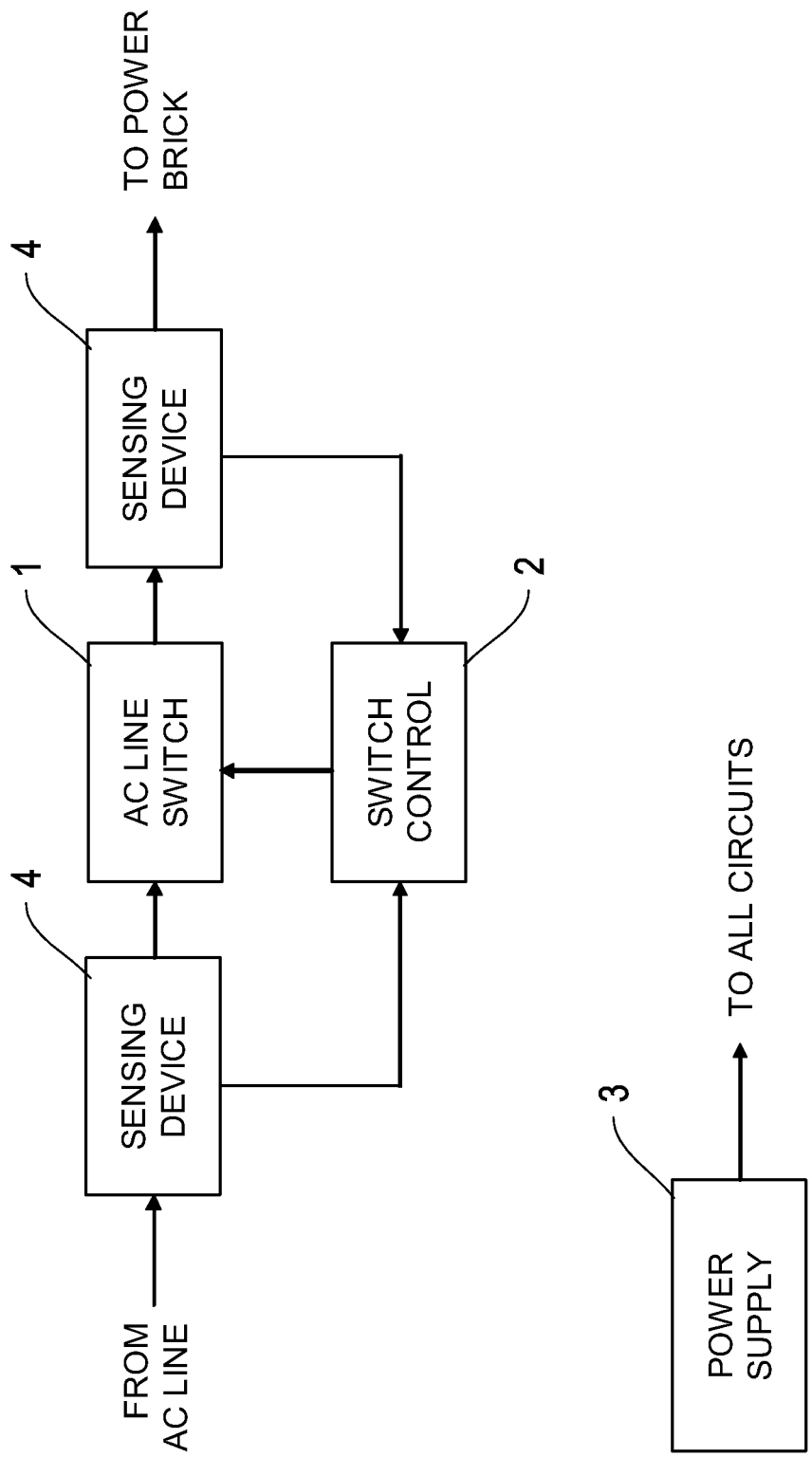
FIG. 3 is a block diagram depicting a sensing device interposed in the path between the AC line and the power brick of the arrangement shown in FIG. 2, according to an illustrative embodiment.

As shown in FIG. 3, two sensing devices 4 and 5 may be placed on either side of an AC line switch 1. The sensing device 5 senses the level of energy flowing through the energy-saving power supply to the power brick 6. The alternative location sensing device 4 is optional and, the sensing device 5 could be the only sensing device. The device 5 may be placed either between the AC line 7 and the switch 1 or between the switch 1 and the power brick 6. As long as the sensing device 5 is placed to detect the energy flowing to the power brick 6 when the switch 1 is closed, its position relative to the switch 1 is immaterial. In one embodiment, the sensing device 5 is simply an ammeter which would detect the current flowing to the power brick 6. The sensing device 5 is connected to the switch control 2 so that the sensing device 5 may send signals to the switch control 2 corresponding to energy sensed by the sensing device 5. Continuing with the ammeter example, the ammeter may send a constant stream of signals to the switch control 2 indicating the level of current sensed by the ammeter. The switch control 2 contains a processor which may be configured to read the signals sent from the sensing device 5.

The configuration of the switch control 2 and the sensing device 5 may enable the energy-saving power supply system to measure the power signature of a battery charger. The energy-saving power supply system may do so by detecting the differential in the energy consumed by a battery charger when it is charging a chargeable electronic device and when the battery charger is not charging a chargeable electronic device. The example of a cellular telephone as the chargeable electronic device and a cellular telephone charger as the battery charger will be used to explain how the energy-saving power supply system in FIG. 3 measures the power signature of a battery charger.

When a cellular telephone charger is first plugged into the power brick 6, the processor in the switch control 2 reads the energy sensed by the sensing device 5. Then, when a cellular telephone is coupled to the cellular telephone charger, the cellular telephone charger is now coupled into circuit with the battery of the cellular telephone. The battery presents a load on the circuit and the current increases to provide power to carry this load. The processor in the switch control 2 detects the upsurge in the energy flowing through the circuit to charge the cellular telephone charger. The processor in the switch control 2 stores the value corresponding to the current consumed by the cellular telephone charger immediately previous to the upsurge. This value is the dormant power signature of the cellular telephone charger, being the energy consumed by the cellular telephone charger when it is not charging a cellular telephone. The energy represented by the dormant power signature continues being drawn and wasted unless the flow of energy to the cellular telephone charger is cut off. The energy-saving power supply system does just that.

Later, when the cellular telephone is decoupled from the cellular telephone charger, the energy flowing through the circuit to the cellular telephone charger drops back to the level present when the load of the battery is removed from the charging circuit. The processor in the switch control 2 detects the drop in energy flowing through the circuit when the cellular telephone is decoupled from its charger and recognizes that the energy flowing through the circuit indicates the dormant power signature previously stored in the processor. Upon detecting this match, the processor in the switch control 2 cuts off power to the circuit by opening the switch 1 which can be a relay or transfer switch. In this manner, the energy-saving power supply system may save energy by preventing energy from being consumed by a battery charger when the battery charger is not charging a chargeable electronic device. The chargeable electronic device could be anything that requires charging, including removable chargeable batteries, like those removed from a typical drill.

The energy-saving power supply system may also recognize when a chargeable electronic device has been plugged back into the battery charger. After the processor in the switch control 2 has cut off power by opening the switch 1, it closes the switch 1 intermittently, e.g., briefly at regular intervals, to determine whether the energy consumed by the battery charger has increased. In one embodiment, the processor in the switch control 2 sends a signal every ten seconds to the switch 1 to close the switch 1 for half a second. During that half second, the processor in the switch control 2 identifies whether the energy detected by the sensing device 5 has increased significantly above the dormant power signature of the battery charger. If so, the processor in the switch control 2 may determine that a chargeable electronic device has been plugged back into the battery charger and may direct the switch 1 to send uninterrupted power to the battery charger again. Optionally, the power supply system then checks the current draw every ten seconds to so if the battery device has been unplugged.

Figure 4:
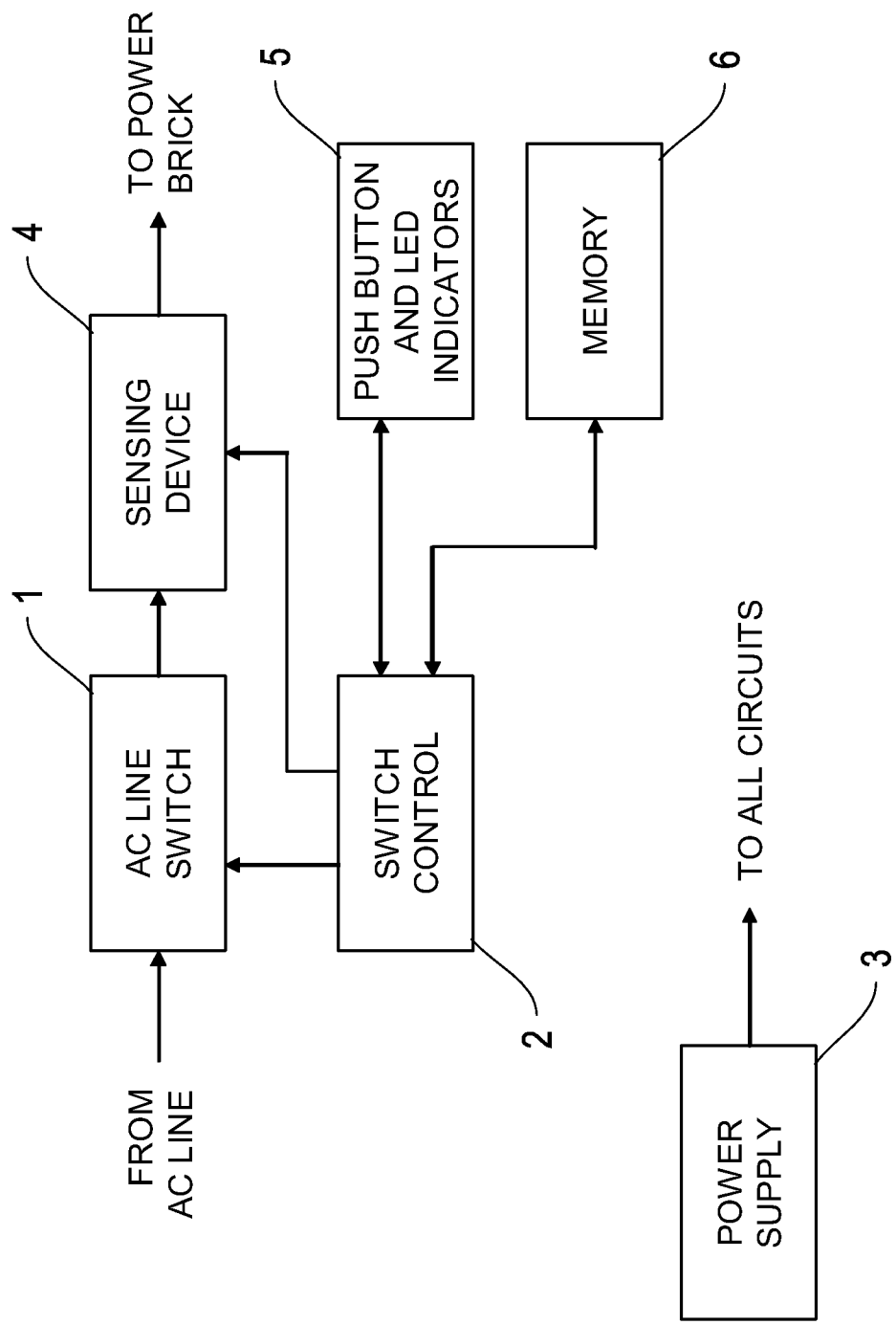
FIG. 4 is a block diagram depicting a memory and push buttons and LED indicators connected to the switch control of the arrangement shown in FIG. 3, according to an illustrative embodiment.

FIG. 4 depicts the arrangement shown in FIG. 3, but with the addition of a memory 6 and a push button and LED indicators 5 connected to the switch control 2. The memory 6 may add the capability of storing the dormant power signatures of one or more battery chargers. When the processor in the switch control 2 identifies the dormant power signature of a battery charger as described above, the processor may save that dormant power signature in the memory 6. In one embodiment, this memory 6 could be an electronic database designed to store a few thousand numeric values. In other possible embodiments, the memory 6 could be located in the switch control 2 or stored remotely. The next time the same battery charger is plugged in, the processor in the switch control 2 determines whether the energy being drawn by the battery charger matches a dormant power signature stored in the memory 6. If the processor identifies a match, the processor again sends a signal to the switch 4 to cut off power. Thus, for example, if the user took the battery charger with her to work during the day and then plugged it into the energy-saving power supply system again at night, the energy-saving power supply system would recognize the battery charger and cut off power to prevent wasted energy.

The push button 5 connected to the switch control 2 provides a way to manually manipulate the switch 1. The user can turn on or off the switch 1 by pushing the push button 5, thereby overriding the switch control 2. The user might, for example, think that her cellular telephone had been charging long enough and desire to cut off power to her cellular telephone by pressing the button. FIG. 4 also includes an LED indicator 5 connected to the switch control 2. In one embodiment, the LED indicator 5 lights up when power flows through the energy-saving power supply system to a battery charger and turns off when the switch is open and power stops flowing through the energy-saving power supply system. Alternative embodiments use different numbers, colors and arrangements of LEDs to signal the operating state of the power supply system.

Figure 5:
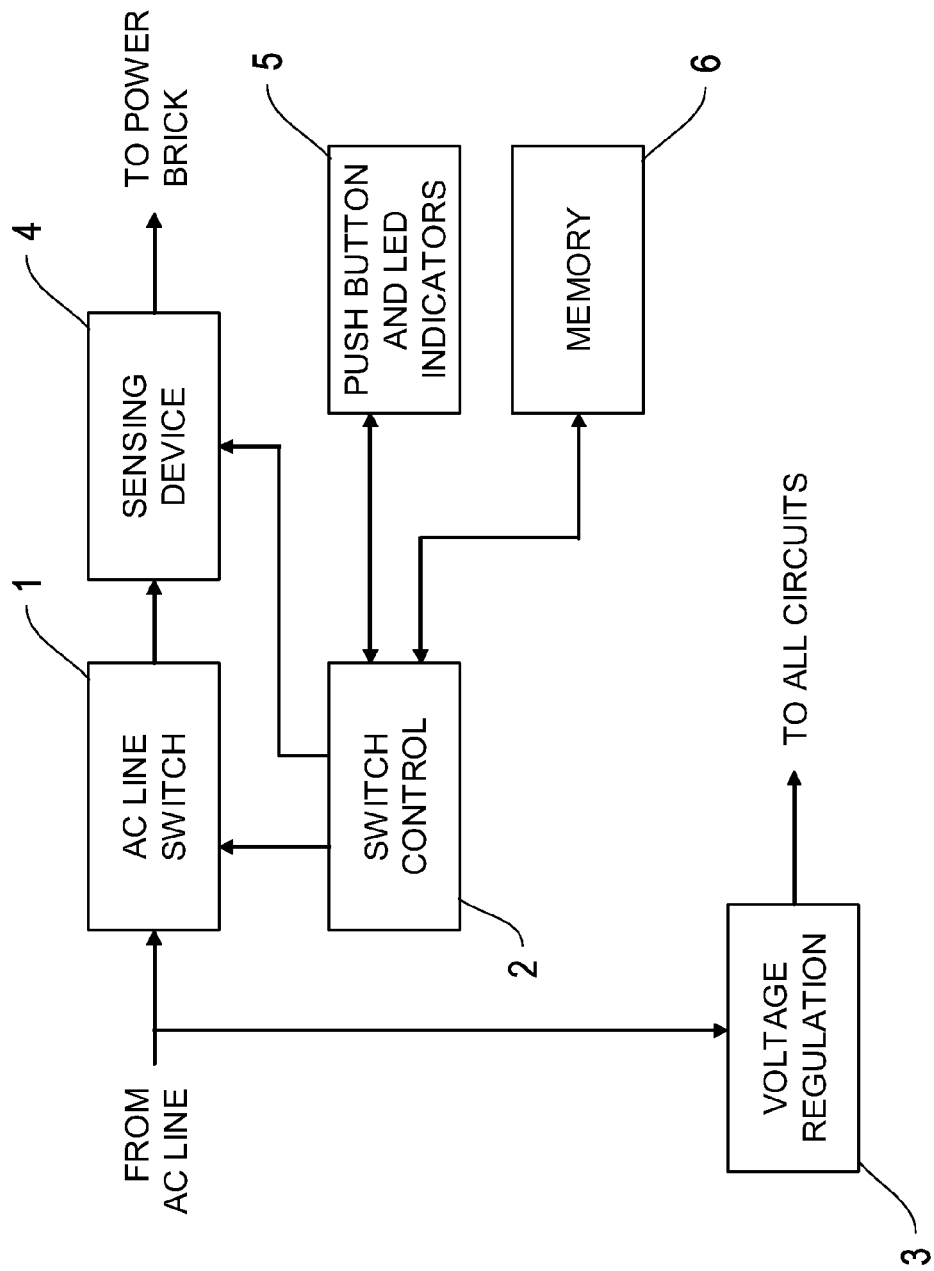
FIG. 5 is a block diagram depicting a voltage regulator disposed in the arrangement shown in FIG. 4, according to an illustrative embodiment.

FIG. 5 depicts that the device may include a voltage regulator 3 that powers the downstream components of the energy-saving power supply system, including for instance the memory 6 and switch control 2. Optionally, the voltage regulator can also provide power to other devices outside of the switched circuit that controls AC/Line 1. Thus, the voltage regulator could provide a direct current source of power for any use.

Figure 6:
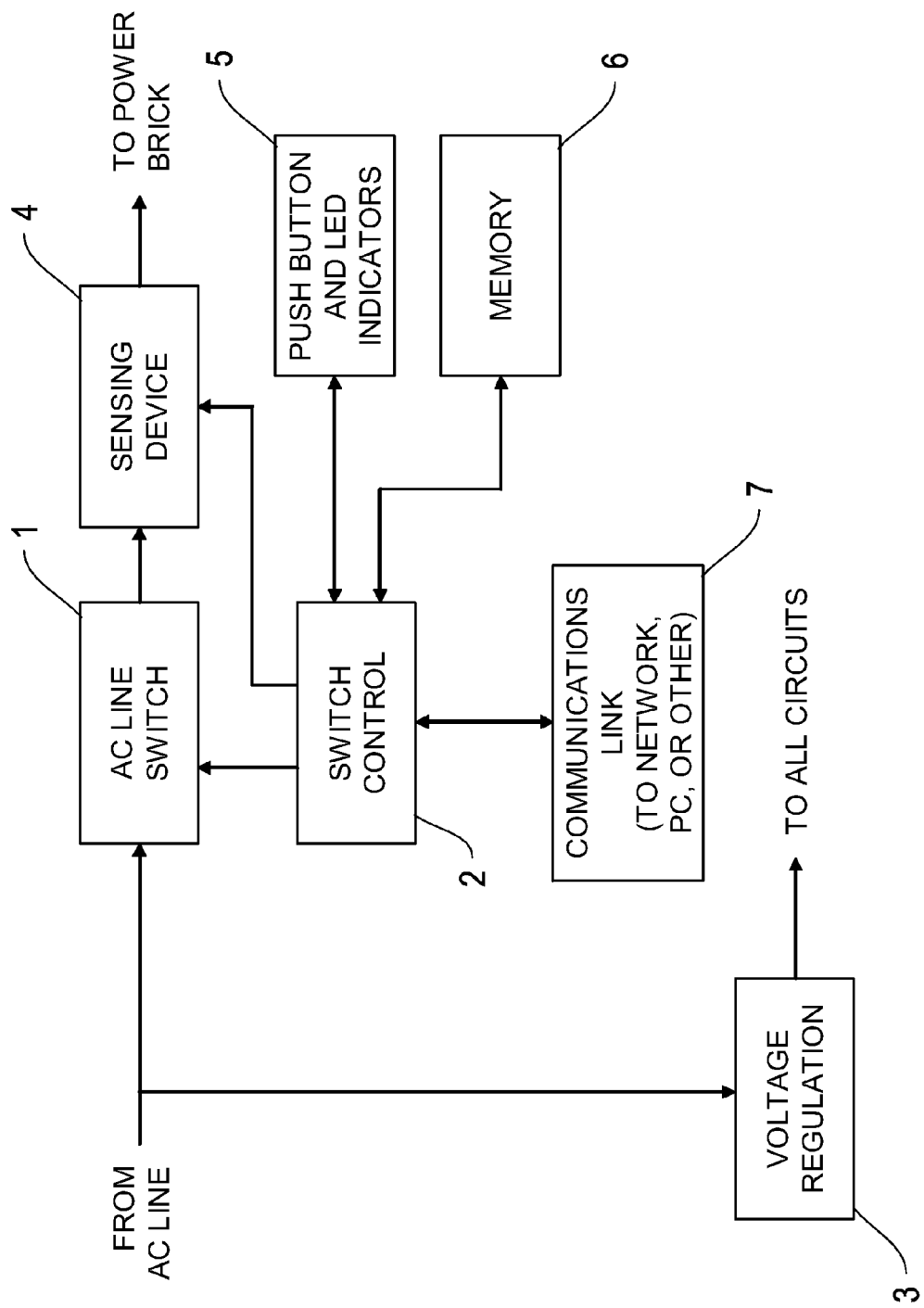
FIG. 6 is a block diagram depicting a communications link connected to the switch control of the arrangement shown in FIG. 5, according to an illustrative embodiment.

FIG. 6 is a block diagram depicting the arrangement shown in FIG. 5, but with a communications link 7 connected to the switch control 2. As discussed in the background, consumers find it gratifying to know how much energy their conservation efforts actually save. Therefore, this energy-saving power supply system includes a communications link 7 to calculate and display the amount of energy saved by the energy-saving power supply system. The energy-saving power supply system includes a software program which collects data from the processor in the switch control 2, specifically, the amount of time the switch control 2 prevented power from going to a battery charger and the dormant power signature of the battery charger. The software program algorithm multiplies the time by the dormant power signature of the attached battery charger to calculate the total amount of energy, money or carbon emissions saved. The software program also calculates the amount of energy saved over different time periods, for example, energy saved over the previous day, the previous week or over the lifetime of the power supply system.

The software program could, in different possible embodiments, be located on a personal computer, on a web server or on the processor in the switch control 2. The software program also includes programs to graphically display these calculations on a web page. The communications link 7 could be coupled to a network interface, such as a connection to the world wide web or a computer, to display the graphics representing the energy savings in a readily accessible manner.

In addition to calculating the amount of energy saved by a particular energy-saving power supply system, the software program also calculates how much energy would be saved if others used the energy-saving power supply system in the same way. For example, in one embodiment, the software program multiplies the energy saved by this particular power supply system by a number representing the estimated number of people in the United States who use chargeable electronic devices. In another possible embodiment, the communications link 7 communicates over a local network or the world wide web to a web server to convey information about how much energy the energy-saving power supply system has saved. The web server could then add the energy savings of that energy-saving power supply system to all the other energy-saving power supply systems that have communicated with it and post on a website the total amount of energy, money or carbon emissions saved by all the energy-saving power supply systems. In this way, the energy-saving power supply system encourages a sense of community and participation to encourage conserving energy.

Figure 7:
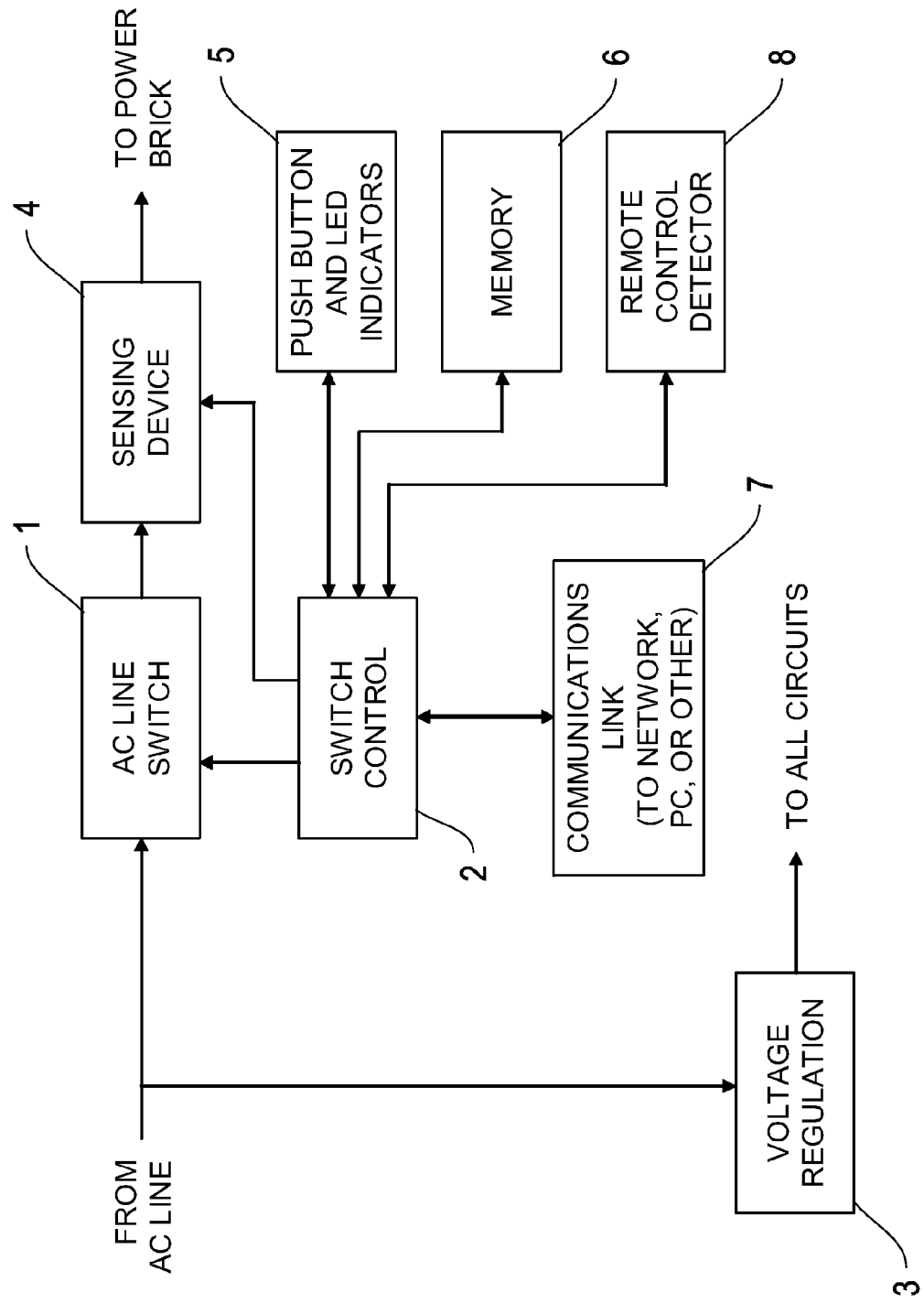
FIG. 7 is a block diagram depicting a remote control detector connected to the switch control of the arrangement shown in FIG. 6, according to an illustrative embodiment.

FIG. 7 is a block diagram depicting the arrangement shown in FIG. 6, but with a remote control detector connected to the switch control. This optional power supply system embodiment has a teachable IR emitter/detector. A user could put the power supply system in learning mode, direct the remote of, for example, a stereo amplifier control at the power supply system and push the remote's "on" button. The power supply system would detect and learn that device's "on" signal (typically, each home electronic device has a designated remote code so that it will not be affected by other remotes). Then, using the power supply system's remote, the user could turn off the power to the amplifier when it is not being used, saving the energy that is normally used to keep the ampler on to detect its remote and the power used to keep components warm for an "instant on" feature. To turn on the amplifier, the user pushes the "on" button on the amplifier's own remote. The power supply system would see that specific "on" signal and turn on power to the amplifier, and then after a sufficient time for the amplifier to power up and "wake up" the power supply system would—using its own IR emitter—retransmit the amplifier's IR "on" signal. Since the IR detection circuit of the amplifier is now active, it can turn itself fully on and start playing music. In another configuration, the power supply system could be made to act as a universal remote, where the power supply system's remote, or buttons on the saver itself are used to control multiple devices. The time delay needed for the specific home electronic device to fully boot and become active after it is supplied with power varies from device to device. In some embodiments, a timer within the power supply system may wait for a pre-determined period of time, e.g., one of a standard set of times, such as one second, two seconds, six seconds, and so on. In some embodiments, the power supply system may have a look up table to determine the pre-determined period of time for the time delay. The system may recognize the code of a specific electronic device's remote and set the time delay accordingly.

Figure 8:
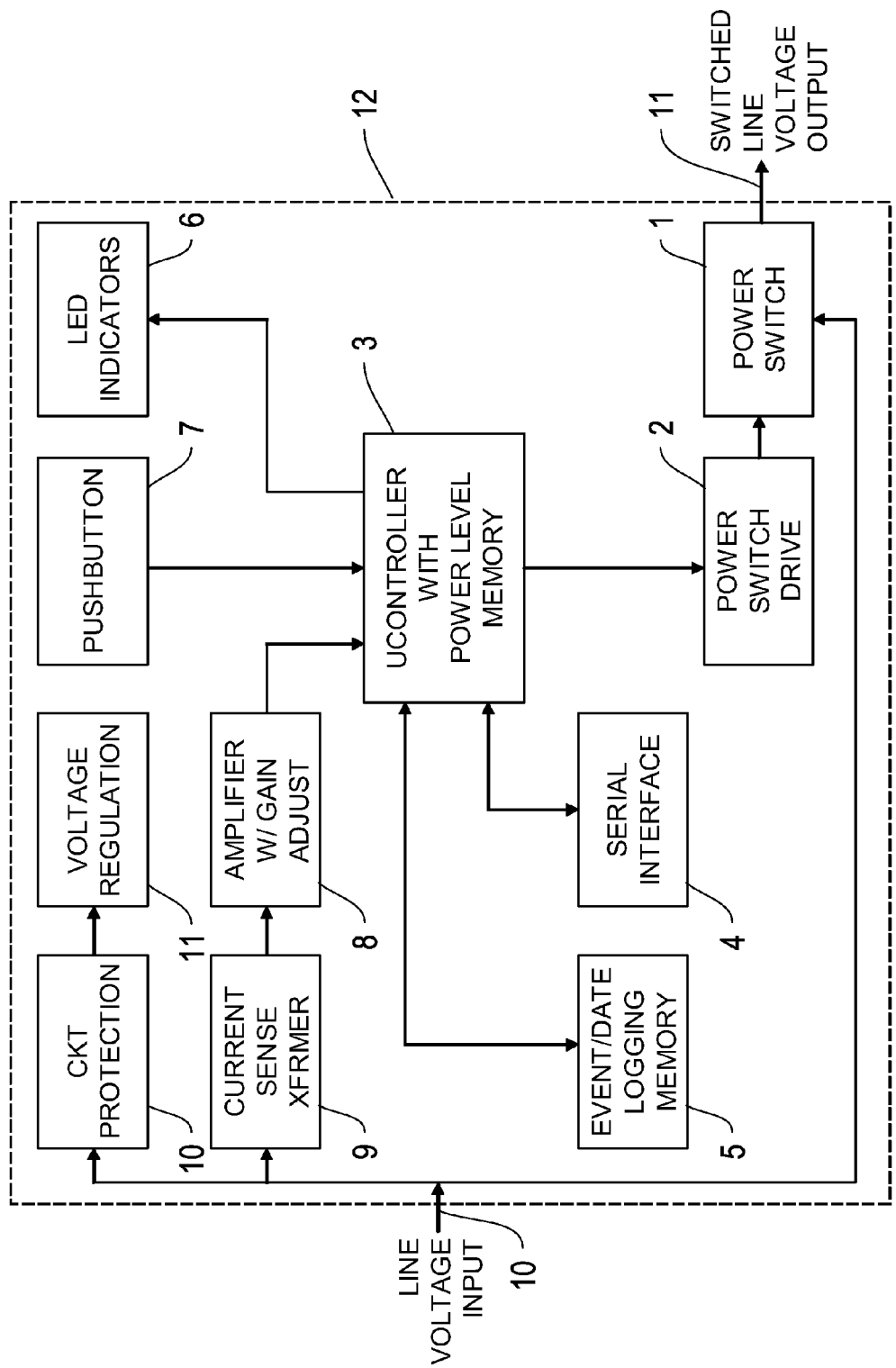
FIG. 8 is a block diagram depicting a prototype implementation of a power supply system, according to an illustrative embodiment.

FIG. 8 is a block diagram depicting a prototype implementation of an energy-saving power supply system 12. Power flows from the line voltage input 10, which could be a standard electrical wall outlet, through the energy-saving power supply system 12 to the switched line voltage output 11. The switched line voltage output 11 is an outlet into which a battery charger may be plugged to access electrical power. The power switch 1 is a switch which controls the level of power running through the energy-saving power supply system 12 to the switched line voltage output 11. The µcontroller 3 contains a processor configured to control the power switch 1. The software on the µcontroller 3 interfaces with the power switch 1 through a power switch driver 2, which translates the software commands into signals readable by the power switch 1. The current sense transformer 9 detects the current running through the system and sends a signal representing the current level to the amplifier 8. The amplifier 8 sends an amplified signal to the µcontroller 3, in which the processor is configured to recognize the signal representing the current level sent from the amplifier 8. As discussed in more detail in FIGS. 1-5, the µcontroller learns the dormant power signature of a battery charger by detecting the differential in energy consumed by a battery charger when a chargeable electronic device is coupled and decoupled from the battery charger. In addition to a processor, the µcontroller 3 also contains a memory, in which it stores the dormant power signature of battery chargers. When the µcontroller 3 recognizes the current level signal from the amplifier 8 as corresponding to a dormant power signature in its memory, the µcontroller 3 cuts off power to the switched line voltage output 11 by opening the power switch 1. By doing so, the µcontroller 3 cuts off power to the batter charger plugged into the switched line voltage output 11, thereby conserving energy.

As described in FIG. 3, the energy-saving power supply system is also designed to recognize when a chargeable electronic device has been plugged back into the battery charger. After the processor in the µcontroller 3 has cut off power by opening the switch 1, it closes the switch 1 intermittently, e.g., briefly at regular intervals, to determine whether the energy consumed by the battery charger has increased. In one embodiment, the µcontroller 3 sends a signal every ten seconds to the switch 1 to close the switch 1 for half a second. During that half second, the µcontroller 3 identifies whether the energy detected by the sensing device 5 has increased significantly above the dormant power signature of the battery charger. If so, the µcontroller 3 determines that a chargeable electronic device has been plugged back into the battery charger and directs the switch 1 to send uninterrupted power to the battery charger again.

The circuit protector 10 is a standard circuit protection device similar to those in most power strips designed to cut off power to the circuit when an overload or a short circuit would damage the elements in the energy-saving power supply system or in a battery charger or chargeable electronic device plugged into the switched line voltage output 11. The voltage regulation 11 element is a standard voltage regulator which controls the voltage in the circuit so as to reduce voltage error.

Data logging can occur such that the controller logs when the power supply system has shut off the charger. The µcontroller can measure the time of the charger being shut off and multiply that time by the power saved by shutting off the charger to measure the kilowatt hours saved. This measure of power saved can be collected from the power supply system by connecting a computer or other device to the serial interface 4. In one embodiment, the serial interface communicates this measure through data packets that can be transmitted as IP data packets over a network to a server. The server can execute an application that processes the measured savings to generate a number representative of the accumulated power savings achieved by using the power supply system. Optionally, the server may also aggregate similar data from other users of power supply systems to generate a global, multi-user measure of how much energy has been collectively saved by users of the power supply systems. A web server coupled to this other server can generate web pages that display the measured global power savings.

Variations, modifications, and other implementations of what is described may be employed without departing from the spirit and scope of the disclosure. More specifically, any of the method, system, and device features described above or incorporated by reference may be combined with any other suitable method, system, or device features disclosed herein or incorporated by reference, and is within the scope of the contemplated systems and methods described herein. The systems and methods may be embodied in other specific forms without departing from the spirit or essential characteristics thereof. The foregoing embodiments are therefore to be considered in all respects illustrative, rather than limiting of the systems and methods described herein. The teachings of all references cited herein are hereby incorporated by reference in their entirety.

The invention claimed is:

1. A power supply system comprising:
an electrical power outlet arranged to removably couple to a battery charger;
a sensing device coupled to the electrical power outlet, arranged for sensing an outlet state representative of at least one of a voltage, a current, and a temperature over a period of time of the electrical power outlet;
a switch arranged for controlling a coupling between a power source and the electrical power outlet;
a processor coupled to the switch and to the sensing device, arranged for:
learning a plurality of outlet states of the electrical power outlet representative of decoupling and coupling of a chargeable electronic device to the battery charger,
identifying decoupling of the chargeable electronic device from the battery charger,
opening the switch to cut power from the power source to the electrical power outlet,
identifying coupling of the chargeable electronic device to the battery charger, and
closing the switch to restore power from the power source to the electrical power outlet; and
a web server coupled to the processor, wherein the web server is arranged for:
determining energy saved by the power supply system over a plurality of time periods, and
generating for display a web page comprising an indication of the energy saved by the power supply system over a plurality of time periods.

2. The power supply system of claim 1, further comprising:
a receiver, coupled to the processor, arranged for receiving a first control signal and a second control signal from a remote control device, wherein the battery charger turns off in response to receiving the first control signal, and wherein the battery charger turns on in response to receiving the second control signal;
a transmitter, coupled to the processor, arranged for transmitting the first control signal and the second control signal to the battery charger; and
a memory arranged for storing a first copy of the first control signal and a second copy of the second control signal;
wherein the processor is further arranged for:
identifying the first control signal wherein the first control signal is received by the receiver from the remote control device;
copying the first control signal to the memory;
identifying the second control signal, wherein the second control signal is received by the receiver from the remote control device;
copying the second control signal to the memory;
retrieving the second copy of the second control signal from the memory; and
transmitting the second copy of the second control signal to the battery charger, wherein the second copy of the second control signal is transmitted a pre-determined period of time after closing the switch.

3. The power supply system of claim 1, wherein the processor is further arranged for intermittently sending power to the battery charger to sense an outlet state of the electrical power outlet when the switch is open.

4. The power supply system of claim 1, further comprising:
a memory arranged for storing a dormant power signature, wherein the dormant power signature represents an outlet state of the electrical power outlet when the electrical power outlet is coupled to the battery charger and the battery charger is decoupled from the chargeable electronic device, and
wherein the processor is further arranged for identifying the dormant power signature of the battery charger.

5. The power supply system of claim 4, wherein the processor is further arranged for:
receiving the outlet state of the electrical power outlet from the sensing device;
retrieving the dormant power signature from the memory;
comparing the received outlet state to the dormant power signature; and
in response to finding the received outlet state to be substantially equal to the dormant power signature, opening the switch to cut power to the battery charger.

6. The power supply system of claim 4, wherein the processor is further arranged for:
receiving the outlet state of the electrical power outlet from the sensing device;
retrieving the dormant power signature from the memory;
comparing the received outlet state to the dormant power signature; and
in response to finding the received outlet state to be substantially not equal to the dormant power signature, closing the switch to provide power to the battery charger.

7. The power supply system of claim 1, wherein the web server is further arranged for:
determining collective energy saved by a plurality of power supply systems; and
generating for display on the web page an indication of the collective energy saved by a plurality of power supply systems.

8. The power supply system of claim 1, wherein the web server includes a network interface to enable a user to access the web page.

9. The power supply system of claim 1, wherein the processor includes the web server.

10. A power supply system comprising:
an electrical power outlet arranged to removably couple to an electronic device;
a switch arranged for controlling a coupling between a power source and the electrical power outlet;
a memory arranged for storing a first copy of a first control signal and a second copy of a second control signal, wherein the electronic device turns off in response to receiving the first control signal, and wherein the electronic device turns on in response to receiving the second control signal;
a processor coupled to the switch and the memory;
a receiver coupled to the processor, arranged for receiving the first control signal and the second control signal from a remote control device; and
a transmitter coupled to the processor, arranged for transmitting the first control signal and the second control signal to the electronic device;
the processor arranged for:

identifying the first control signal, wherein the first control signal is received by the receiver from the remote control device;

copying the first control signal in the memory;

opening the switch to cut power from the power source to the electrical power outlet;

identifying the second control signal, wherein the second control signal is received by the receiver from the remote control device;

copying the second control signal in the memory;

closing the switch to restore power from the power source to the electrical power outlet;

retrieving the second copy of the second control signal from the memory; and transmitting the second copy of the second control signal to turn on the electronic device, wherein the second copy of the second control signal is transmitted a pre-determined period of time after closing the switch.

11. The power supply system of claim 10, wherein the remote control device is coupled with at least one of the electronic device and the power supply system.

12. The power supply system of claim 10, wherein the pre-determined period of time is associated with the electronic device.

13. The system of claim 10, wherein the first control signal and the second control signal are received over a computer network.

14. The system of claim 10, wherein the processor is further arranged for routing Internet data.

15. The system of claim 14, wherein the Internet data comprises Internet Protocol (IP) data packets.

16. The system of claim 14, wherein the processor is further arranged for receiving signals from the Internet.

17. The system of claim 10, wherein the receiver is further arranged for receiving Internet data.

18. The system of claim 10, wherein the transmitter is further arranged for transmitting Internet data.

19. The system of claim 10, wherein the processor is further arranged for receiving signals from the Internet.

20. A method for supplying power comprising:

providing an electrical power outlet arranged to removably couple to an electronic device;

providing a switch to control the coupling between a power source and the electrical power outlet;

identifying a first control signal to turn off the electronic device, wherein the first control signal is received from a remote control device;

storing a first copy of the first control signal in a memory;

opening the switch to cut power from the power source to the electrical power outlet;

identifying a second control signal to turn on the electronic device, wherein the second control signal is received from the remote control device;

storing a second copy of the second control signal in the memory;

closing the switch to restore power from the power source to the electrical power outlet;

retrieving the second copy of the second control signal from the memory; and transmitting the second copy of the second control signal to turn on the electronic device, wherein the second copy of the second control signal is transmitted a pre-determined period of time after closing the switch.

* * * * *